United States Patent
Kim

(10) Patent No.: US 11,046,275 B1
(45) Date of Patent: Jun. 29, 2021

(54) SEAT BELT MODULE

(71) Applicants: Hyundai Motor Company, Seoul (KR); Kia Motors Corporation, Seoul (KR)

(72) Inventor: Young Rok Kim, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 16/874,461

(22) Filed: May 14, 2020

(30) Foreign Application Priority Data

Dec. 10, 2019 (KR) ........................ 10-2019-0163961

(51) Int. Cl.
*B60R 22/48* (2006.01)
*B60R 21/015* (2006.01)

(52) U.S. Cl.
CPC .. *B60R 21/01546* (2014.10); *B60R 21/01548* (2014.10); *B60R 22/48* (2013.01); *B60R 2022/4816* (2013.01); *B60R 2022/4825* (2013.01)

(58) Field of Classification Search
CPC .............. B60R 21/01546; B60R 22/48; B60R 21/01548; B60R 2022/4825; B60R 2022/4816
See application file for complete search history.

(56) References Cited

U.S. PATENT DOCUMENTS

| | | | | |
|---|---|---|---|---|
| 6,853,298 | B1 * | 2/2005 | Stojanowski | B60R 22/48 180/268 |
| 7,842,894 | B2 * | 11/2010 | Borst | B60R 22/48 200/61.58 B |
| 8,988,211 | B2 * | 3/2015 | Masudaya | B60R 22/48 340/457.1 |
| 9,650,016 | B2 * | 5/2017 | Andreen | G06K 9/4633 |
| 9,989,382 | B2 * | 6/2018 | Anastasiadis | G01D 5/145 |
| 10,046,735 | B1 * | 8/2018 | Johnson | G08B 21/02 |
| 10,137,852 | B2 * | 11/2018 | Foltin | B60R 21/01534 |
| 10,150,446 | B2 * | 12/2018 | Le | G01B 11/02 |
| 10,272,872 | B2 * | 4/2019 | Le | B60R 22/48 |
| 10,315,620 | B1 * | 6/2019 | Morgantini | B60R 21/01532 |
| 10,457,208 | B1 * | 10/2019 | Moffa | B60N 2/242 |
| 10,471,930 | B2 * | 11/2019 | Thomas | B60R 22/48 |
| 10,730,465 | B2 * | 8/2020 | Naghizadeh | G06K 9/00838 |
| 10,787,150 | B2 * | 9/2020 | Bunin | B60R 22/48 |
| 10,850,702 | B2 * | 12/2020 | Dingli | G06F 9/3004 |
| 2017/0305340 | A1 * | 10/2017 | Rose | B60N 2/28 |
| 2020/0254966 | A1 * | 8/2020 | Ots | B60R 22/48 |
| 2020/0384947 | A1 * | 12/2020 | Wohllebe | G06Q 10/20 |
| 2021/0106855 | A1 * | 4/2021 | Al-Rasheed | A44B 11/2569 |

FOREIGN PATENT DOCUMENTS

KR 10-2019-0066130 A 6/2019

* cited by examiner

*Primary Examiner* — Ruth Ilan
(74) *Attorney, Agent, or Firm* — Morgan, Lewis & Bockius LLP

(57) ABSTRACT

A seat belt module includes a buckle having an internal slider and an insertion hole through which a tongue of a seat belt is configured to be inserted and fastened so that the slider protrudes above the tongue to be externally exposed of the buckle in a response to an insertion of the tongue. The seat belt module also includes a sensor mounted in an internal space of a vehicle to detect the slider exposed to the outside.

15 Claims, 3 Drawing Sheets

SEAT BELT MODULE

CROSS REFERENCE TO RELATED APPLICATION

The present application claims priority to Korean Patent Application No. 10-2019-0163961, filed Dec. 10, 2019, the entire contents of which is incorporated herein for all purposes by this reference.

BACKGROUND OF THE INVENTION

Field of the Invention

The present invention relates to a seat belt module. More particularly, the present invention relates to a seat belt module capable of transmitting a warning signal when it is determined that a seat belt of a boarding seat occupied by an occupant has not been fastened by checking the fastened state of the seat belt by optically detecting a slider protruding above a tongue from the interior of a buckle when the tongue is inserted into the buckle.

Description of Related Art

A seat belt of a vehicle is a device that secures an occupant to a seat and prevents the occupant from colliding with the interior, windshield, or other occupant of a vehicle. If a collision of the vehicle occurs, a function of preventing a secondary collision is required for the safety of the occupants. Most vehicles produced in recent years are designed to generate a warning sound when the seat belt is not fastened.

On the other hand, the development of autonomous vehicles which may be driven by themselves without the driver's operation is being actively made. In a response to the era of autonomous vehicles, airbags that keep occupants safe are changing in various forms. With the development of autonomous driving technology, it is expected that the demands of consumers on safety devices will be further increased as the driver's control and braking are less involved.

As the vehicle is evolving from a simple transportation means to a living space, it is expected that the seating arrangement and the riding attitude will change, and the shape of the seat belt is also expected to change. The current seating arrangement in which seats face forwards may freely change to the seating arrangement in which seats face each other or are adjusted independently. Therefore, in consideration of the seating arrangement of the autonomous vehicle, unlike the conventional seat belt provided to a pillar, a seat belt provided to a seat is currently developed.

Furthermore, the conventional seat belt has a problem that since a warning switch mounted on a buckle and the wiring of the warning switch are connected to the electronic equipment to generate a warning sound, such arrangement is not suitable for the seating arrangement for the autonomous vehicle. For example, if the seat rotates 360 degrees, the connection between the buckle and the wiring may be twisted or broken. Furthermore, there are also other problems that when a wireless communication device such as a Bluetooth device or the like is connected to each seat to wirelessly connect the warning switch, the cost of the warning switch may increase, the wireless connection may be cut off, or a signal delay may occur depending on the surrounding environment, and periodic replacement of a battery may be required.

Although Korean Patent Application Publication No. 10-2019-0066130 discloses a method and device configured for checking the fastening of a seat belt, the disclosed scheme is not suitable for application to an autonomous vehicle.

Therefore, it is necessary to develop a seat belt module which may solve these problems.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a seat belt module configured for determining whether an occupant fastens a seat belt regardless of an arrangement or position, or moving ability of vehicle seats.

Furthermore, various aspects of the present invention are to provide a seat belt module configured for recommending an occupant to fasten a seat belt by detecting a seat occupied by the occupant and detecting whether the occupant fastens the seat belt.

Various aspects of the present invention are directed to providing a seat belt module including: a buckle having an internal slider and an insertion hole through which a tongue of a seat belt is configured to be inserted and fastened so that the slider protrudes above the tongue to be externally exposed of the buckle in a response to an insertion of the tongue; and a sensor mounted in an internal space of a vehicle to detect the slider exposed to the outside.

The seat belt module may further include: a controller connected to the sensor and configured to, when the sensor detects the slider, determine that a seat belt of a corresponding seat is fastened.

The sensor may be an optical sensor or a radar sensor mounted on an overhead console or a roof of a vehicle to detect the slider.

The buckle may include: a main body including an insertion hole, wherein the tongue is moved in and out through the insertion hole into a locked state or a released state, and having a guide groove provided above the insertion hole; a rotation element rotatably mounted in the main body, wherein the rotation element is pivotally connected to the slider and provided on a path through which the tongue is inserted into the insertion hole so that the rotation element is rotated in a response to an insertion of the tongue; and a slider rotatably coupled inside the main body to the rotation element so that the slider rotates together with the rotation element rotating in a response to an insertion of the tongue to protrude to the outside along the guide groove.

When the tongue is released, the rotation element may be reversely rotated, and the slider may be accommodated in the main body along the guide groove in a response to a reverse rotation of the rotation element.

When the tongue is inserted into the insertion hole, the buckle may be rotated by the tongue to fix the rotation element in a state of the slider protruding to the outside of the main body.

The sensor may be a radar sensor having a radar antenna, the slider may be formed of a metal material, and the sensor may be configured to detect a change in reflectance by the slider through the radar antenna.

The sensor may be a multi-dimensional sensor, and the controller may be configured to detect which seat has the buckle in which the slider is detected with the multidimensional data collected by the sensor, among the plurality of seats.

The controller may be configured to check a seat occupied by an occupant among the plurality of seats of a vehicle, and detect the slider of the buckle of the occupied seat, and the controller may be configured to transmit a warning signal when the slider of the buckle in the occupied seat is not detected.

The seat belt module may further include: a webbing strip with sensor targets provided at regular intervals, wherein the sensor targets are detected by the sensor such that the number of the sensor targets changes in a response to a drawing amount of the webbing strip.

The controller may be configured to determine the number of the sensor targets detected through the sensor, and determine body information related to an occupant in the seat through the determined number of the sensor targets.

The seat belt module may further include: a webbing strip with sensor targets applied to a surface thereof, wherein the sensor targets are detected by the sensor; and a controller connected to the sensor and configured to detect a distance of the sensor target from a seat back to recognize the body information and misuse state of the occupant.

According to an exemplary embodiment of the present invention, the seat belt module has an advantage that the fastened state of the seat belt may be detected by detecting the protruded state of the slider protruding when the tongue is inserted into the buckle in the seat, and the seat belt module is also advantageously applicable to various seating arrangements of autonomous vehicles.

Furthermore, the seat belt module has an advantage of securing the occupants safety by checking the fastened state of the seat belt and recommending the occupant to fasten the seat belt.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
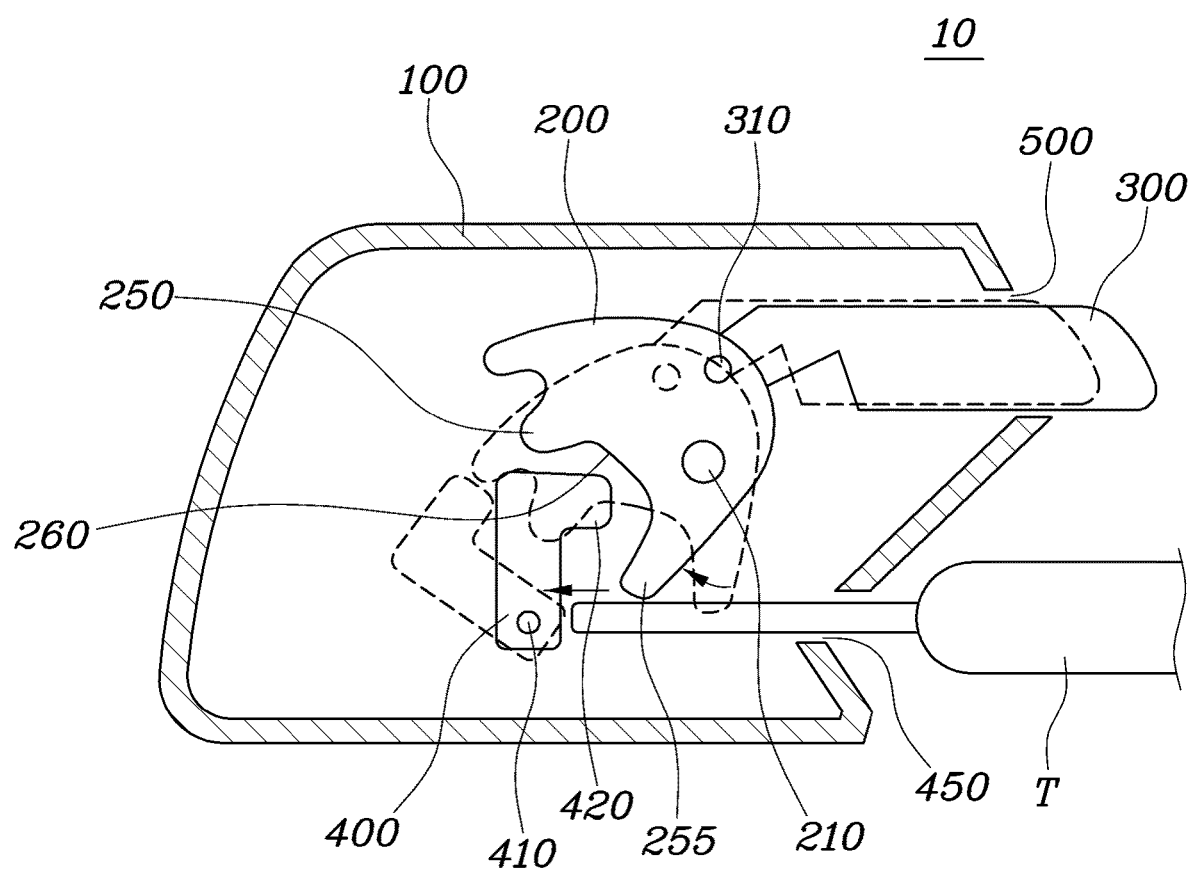
FIG. 1 is a cross-sectional view exemplarily illustrating a buckle of a seat belt module according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural to functional descriptions of the exemplary embodiments of the present invention included herein are only illustrated for describing the exemplary embodiments according to an exemplary embodiment of the present invention. The exemplary embodiments of the present invention may be implemented in various forms, and may not be construed as limited to the exemplary embodiments described herein.

The terminology used herein is for describing various exemplary embodiments only and is not intended to be limiting the present invention. Singular expressions include plural expressions unless the context clearly indicates otherwise. It will be further understood that the terms "comprise(s)" and/or "comprising," and "includes" and/or "including," when used in the exemplary embodiment, specify the presence of stated features, numbers, steps, operations, elements, components or a combination thereof, but do not preclude the presence or addition of one or more other features, numbers, steps, operations, elements, components or a combination thereof.

Unless otherwise defined, all terms including technical and scientific terms used herein have the same meaning as commonly understood by one of ordinary skill in the art to which an exemplary embodiment of the present invention belongs. It will be further understood that terms used herein may be interpreted as having a meaning which is consistent with their meaning in the context of the present specification and the relevant art and will not be interpreted in an idealized or overly formal sense unless so defined herein.

Hereinafter, various exemplary embodiments of the present invention will be described in detail with reference to the accompanying drawings in which like reference numerals denote like elements.

FIG. 1 is a cross-sectional view exemplarily illustrating a buckle 10 of a seat belt module according to an exemplary embodiment of the present invention.

Referring to FIG. 1, the seat belt module may include the buckle 10, a sensor, and a controller.

The buckle 10 may be coupled to a vehicle seat. The buckle 10 is externally provided with an insertion hole, through which a tongue T of a seat belt is inserted and fastened.

The buckle 10 is internally provided with a slider 300, which protrudes above the tongue T when inserted into the buckle. When the slider 300 protrudes, the slider 300 may protrude out of the buckle 10 so that the slider is positioned above the tongue T.

The sensor may be mounted in the internal space of a vehicle. The sensor may be an optical sensor, a radar sensor, or other sensor that performs a function to be described later, without limitation thereto. The sensor may detect the slider 300 when the slider 300 is externally exposed of the buckle 10. Therefore, the fastened state of the seat belt may be detected by detecting the exposed state of the slider 300. The sensor can accurately detect the fastened state of the seat belt by detecting that the slider 300 has been externally exposed from the upper side of the tongue T.

The sensor may be mounted in an overhead console or a loop of a vehicle to detect the slider 300. Since the overhead console or the roof of the vehicle is located above the internal space of the vehicle so that the sensor can detect the internal space as a whole, the slider 300 may be easily detected. However, the position of the sensor is not limited and may be mounted anywhere in the vehicle interior space.

Furthermore, the seat belt module according to an exemplary embodiment of the present invention may further include a controller.

When the sensor detects the slider 300, the controller may be configured to determine that the seat belt of the corresponding seat is fastened. That is, when the slider 300 is inside the buckle 10, the sensor does not detect the slider 300, and when the slider is exposed to the outside, the sensor detects the slider 300, and the controller detects whether the seat belt of the corresponding seat belt is fastened.

As illustrated in FIG. 1, the buckle 10 may include a main body 100, a rotation element 200, a slider 300, and a fixing pin 400.

The main body 100 forms the entire external contour of the buckle 10. The main body 100 is provided with an insertion hole 450 through which the tongue T may be moved in and out into a locked state or a released state. Furthermore, the main body 100 may have a guide groove 500 penetrating therein. The guide groove 500 is a path which is positioned above the insertion hole 450 so that the slider 300 is moved into and out of the main body 100 therethrough.

The rotation element 200 is configured to move the slider 300 into and out of the main body 100. The rotation element 200 is rotatably mounted in the main body 100 on the path along which the tongue T is inserted into the insertion hole 450. Since a portion of the rotation element 200 is provided on the path along which the tongue T is inserted into the insertion hole 450, the rotation element may interfere with the tongue T which is being inserted into the insertion hole 450.

When the tongue T is inserted, the rotation element 200 is pushed out and rotated along a rotation shaft 210 thereof by the tongue T to allow the slider 300 to be externally exposed of the main body 100 through the guide groove 500. The guide groove 500 is formed above the insertion hole 450 so that the slider 300 may protrude above the tongue T and be detected by the sensor.

Furthermore, when the tongue T is released, the rotation element 200 is reversely rotated by the tongue T so that the slider 300 is accommodated into the main body 100 along the guide groove 500. Accordingly, when the tongue T is released, the slider 300 may be automatically inserted into the buckle 10.

The slider 300 is coupled inside the main body 100 such that the slider is rotatable with respect to the rotation element 200. The rotation shaft 310 of the slider 300 may be provided at a portion where the slider 300 and the rotation element 200 are rotatably connected together. When the rotation element 200 is rotated with the tongue T, the rotation element 200 protrudes out along the guide groove 500. The slider 300 may have a suitable length and thickness such that when protruding to the outside, the slider may be detected by the sensor. The thickness of the slider may be thinner than the guide groove 500, and the length of the slider may be longer than a distance from the connection with the rotation element 200 to the guide groove 500.

Furthermore, the slider may be provided on the bottom surface thereof with a stepped portion recessed inwardly. When the slider 300 is externally exposed of the main body 100, the stepped portion may be coupled to the insertion hole 450 of the main body 100. Therefore, the slider 300 may be fixed in an exposed state. When the seat belt is released, the occupant lifts the exposed slider 300 upward so that the stepped portion is decoupled from the insertion hole 450. Accordingly, the rotation element 200 is reversely rotated so that the slider 300 may be inserted again into the main body 100.

Furthermore, the buckle 10 may further include a fixing pin 400. When the tongue T is inserted, the fixing pin 400 may be rotated by the tongue T to fix the rotation element 200 to prevent the rotation element 200 from being reversely rotated again.

In an exemplary embodiment of the present invention, the rotation element 200 includes legs 250 and 255 and a groove 260 between the legs 250 and 255 and the fixing pin 400 may include a protrusion 420 which is selectively engaged to the groove 260.

The fixing pin 400 is provided with a rotation shaft 410 on the path through which the tongue T is inserted. When the tongue T rotates while pressing an end of the fixing pin 400 with respect to the rotation shaft 410 of the fixing pin 400, the rotation element 200 may be fixed to the fixing pin 400. Therefore, the slider 300 may be fixed in a protruded state to the outside of the main body 100. The rotation element 200 has the groove 260 to which the fixing pin 400 is coupled, and when the tongue T is inserted, the groove 260 may be positioned at a position to which the fixing pin 400 moves. Therefore, when the fixing pin 400 is inserted into the groove 260 and coupled to the rotation element 200, the slider 300 may maintain the state of being exposed to the outside. However, the fixing pin is not limited to the rotation fixing pin 400 shown in the drawings, and may have any structure when it can fix the rotation element 200 in connection with the insertion of the tongue T and the rotation of the rotation element 200.

Figure 2:
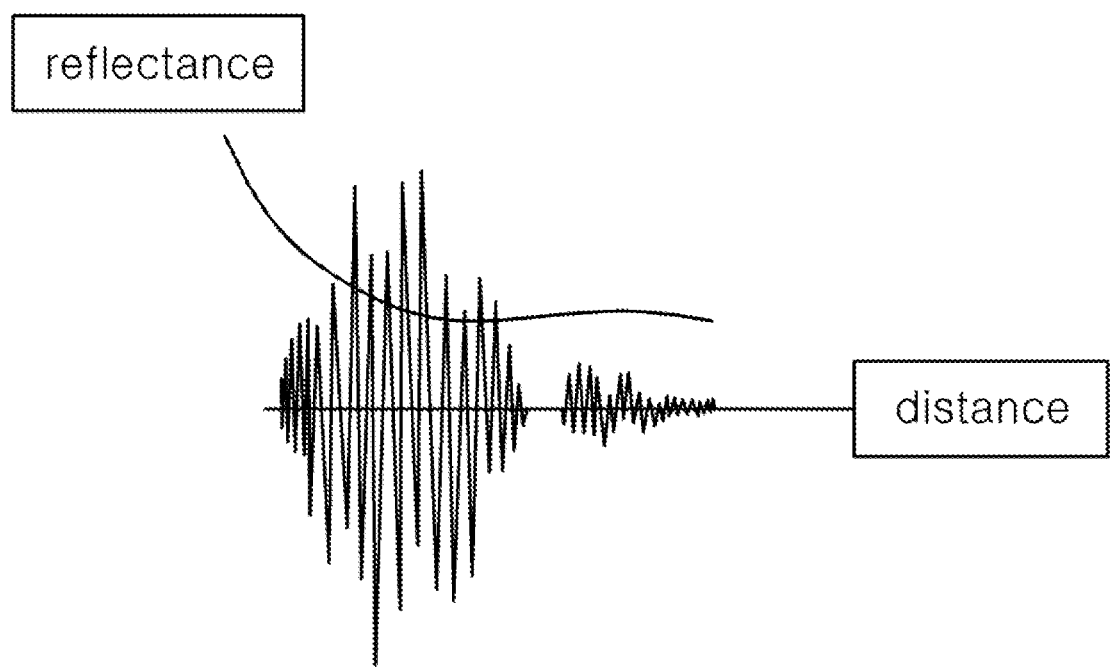
FIG. 2 is a graphical diagram illustrating the reflectance detected by a sensor before a slider of the seat belt module protrudes, according to an exemplary embodiment of the present invention.
Figure 3:
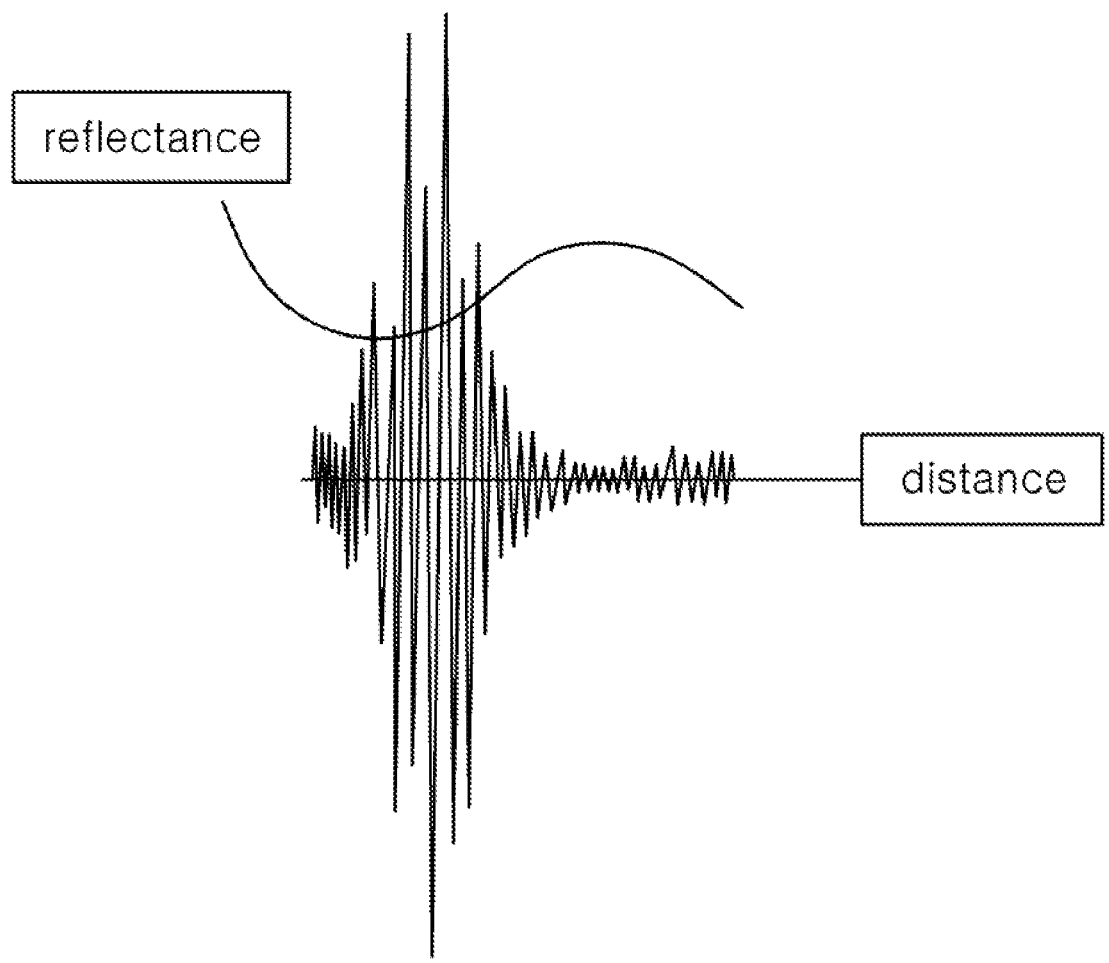
FIG. 3 is a graphical diagram illustrating the reflectance detected by a sensor after the slider of the seat belt module protrudes according to an exemplary embodiment of the present invention.

FIG. 2 and FIG. 3 are graphical diagrams illustrating the reflectance when the slider of the seat belt module is detected by a sensor, according to an exemplary embodiment of the present invention.

The sensor may be a radar sensor. The radar sensor may be provided with a radar antenna. The slider 300 may be formed of a metal material. As illustrated in FIG. 2 and FIG. 3, the radar antenna may detect a change in reflectance in a response to the slider 300 made of metal.

Referring to FIG. 2 and FIG. 3, the change in the reflectance detected by the sensor according to the distance before and after the seat belt is fastened may be verified.

FIG. 2 is a graphical diagram illustrating the reflectance detected by the sensor before the seat belt is fastened. The reflectance before the fastening of the seat belt shows a graph in which the reflectance gradually decreases according to the distance between the sensor and the buckle 10. Therefore, when the graph of the reflectance according to the distance is gentle, it may be determined that the seat belt is not fastened. In the normal state, the reflectance graph for the seat belt is shown as such.

FIG. 3 is a graphical diagram illustrating the reflectance detected by the sensor after the seat belt is fastened. Referring to FIG. 3, when the occupant fastens a seat belt so that the slider 300 protrudes above the tongue T, the reflectance is changed. As illustrated in FIG. 3, when the slider 300 is detected by the sensor, the amplitude of the reflectance is greatly increased, and the waveform of the reflectance graph with the distance is also changed into a sinusoidal shape. Accordingly, when the sensor detects the slider 300, the sensor detects a change in reflectance, verifying whether the seat belt has been fastened.

The sensor may also be a multi-dimensional sensor. The sensor can collect multi-dimensional data to identify the positions of seats. The controller may detect which seat has the buckle in which the slider 300 is detected with the multi-dimensional data collected by the sensor, among the plurality of seats. The controller may be configured to determine a boarding seat occupied by an occupant and detect the slider 300 of the buckle 10 provided in the corresponding boarding seat. Detecting the seat occupied by an occupant may performed by a pressure sensor or the like provided in a seat cushion. Various known techniques may be applied to the present configuration, and thus a detailed description thereof will be omitted since it is well known to those skilled in the art.

The sensor may detect the occupied seat to detect whether the buckle 10 in which the slider 300 is detected is the buckle 10 of the occupied seat, and the controller may transmit a warning signal to the occupant. That is, when the slider 300 of the occupied seat is not exposed even if the slider 300 of the other seats is exposed, the controller is configured to determine that the seat belt has not been fastened and transmits a warning signal. Therefore, when the slider of the occupied seat is not exposed even if the tongue T is inserted into the buckle 10 of an empty seat, which is not occupied by an occupant, so that the slider 300 is exposed, the controller continuously transmits a warning signal. That is, the seat belt module of the present invention is configured to check both the occupied state of a seat and the fastened state of the seat belt of the occupied seat at the same time, reliably protecting the occupant. The warning signal may be a display or sound signal, or similar other signals.

Furthermore, the seat belt module according to an exemplary embodiment of the present invention may further include a webbing strip with sensor targets provided at regular intervals, wherein the sensor targets are detected by a sensor. The sensor may detect a drawing amount of the webbing strip by detecting the sensor targets. The sensor may determine the number of detected detecting units and transmit the corresponding information to the controller, and the controller may be configured to determine body type information related to the occupant sitting on the seat through the received number of sensor targets.

Furthermore, the sensor targets detected by the sensor may be applied to the surface of the webbing strip. The sensor may detect a distance of a sensor target from a seat back, and transmit the detected information to the controller. The controller may be configured to determine the body type information and misuse of the occupant in the seat through the received distance. Regardless of the occupant's body type, gender, and age, the webbing strip is coupled to the buckle 10 in a similar path, and thus if the distance of the webbing strip from the seat back is out of the normal numerical range, it may be determined that the seat belt is misused. For example, if the occupant sits on a seat in which the webbing strip has been coupled to the buckle 10, so that the occupant is not substantially protected by the seat belt, the distance of the webbing strip from the seat back is detected to have a very small value. In the instant case, the controller may be configured to determine the misuse of the seat belt to recommend the normal use of the seat belt by transmitting a warning signal, for example.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A seat belt module comprising:
  a buckle having an slider and an insertion hole through which a tongue of a seat belt is configured to be inserted and fastened so that the slider is protrudingly positioned above the tongue to be externally exposed of the buckle in a response to an insertion of the tongue; and
  a sensor mounted in an internal space of a vehicle to detect the slider exposed to an outside of the buckle.

2. The seat belt module according to claim 1, further including:
  a controller connected to the sensor and configured to, when the sensor detects the slider, determine that the seat belt is fastened.

3. The seat belt module according to claim 2, wherein the sensor is a multi-dimensional sensor, and the controller is configured to detect which seat has the buckle in which the slider is detected with the multi-dimensional data collected by the sensor, among a plurality of seats including the seat.

4. The seat belt module according to claim 3, wherein the controller is configured to check a seat occupied by an occupant among the plurality of seats of the vehicle, and detect the slider of the buckle of the occupied seat.

5. The seat belt module according to claim 4, wherein controller is configured to transmit a warning signal when the slider of the buckle in the occupied seat is not detected.

6. The seat belt module according to claim 1, wherein the sensor is an optical sensor or a radar sensor and mounted on an overhead console or a roof of the vehicle to detect the slider.

7. The seat belt module according to claim 1, wherein the buckle further includes:
  a main body including the insertion hole, wherein the tongue is moved in and out through the insertion hole to be into a locked state to the main body or a released state from the main body, and having a guide groove provided above the insertion hole;
  a rotation element rotatably mounted in the main body, wherein the rotation element is pivotally connected to an end of the slider and provided on a path through which the tongue is inserted into the insertion hole so that the rotation element is rotated in a response to a movement of the tongue; and the slider rotatably coupled inside the main body to an end of the rotation element so that the slider rotates with the rotation element rotating in the response to the movement of the tongue to protrude to the outside of the buckle along the guide groove.

8. The seat belt module according to claim 7, wherein when the tongue is released, the rotation element is reversely rotated by a movement of the slider, and the slider is accommodated in the main body along the guide groove in a response to a reverse rotation of the rotation element pivotally connected to the slider.

9. The seat belt module according to claim 7, further including a fixing pin rotatably connected to the main body, wherein when the tongue is inserted into the insertion hole, the fixing pin is rotated by the tongue to fix the rotation element in a state of the slider protruding to an outside of the main body.

10. The seat belt module according to claim 9, wherein the rotation element includes first and second legs and a groove formed between the first and second legs and the fixing pin includes a protrusion which is selectively engaged to the groove when the tongue presses an end of the fixing pin.

11. The seat belt module according to claim 1, wherein the sensor is a radar sensor having a radar antenna.

12. The seat belt module according to claim 11, wherein the slider is formed of a metal material, and the sensor is configured to detect a change in reflectance by the slider through the radar antenna.

13. The seat belt module according to claim 1, further including a webbing strip with sensor targets provided at predetermined intervals, wherein the sensor targets are detected by the sensor so that a number of the sensor targets changes in a response to a drawing amount of the webbing strip.

14. The seat belt module according to claim 13, further including:
- a controller connected to the sensor and configured to, when the slider is detected by the sensor, determine that the seat belt of the seat is fastened,
- wherein the controller is configured to determine the number of the sensor targets detected through the sensor, and determine body information related to an occupant in the seat through the determined number of the sensor targets.

15. The seat belt module according to claim 1, further including:
- a webbing strip with sensor targets applied to a surface thereof, wherein the sensor targets are detected by the sensor; and
- a controller connected to the sensor and configured to, when the slider is detected by the sensor, determine that the seat belt of the seat is fastened,
- wherein the controller is configured to detect a distance of a sensor target among the sensor targets from a seat back to recognize body information and misuse state of an occupant.

* * * * *